(12) United States Patent
Tsuyuzaki et al.

(10) Patent No.: US 8,500,178 B2
(45) Date of Patent: Aug. 6, 2013

(54) BUMPER STRUCTURE FOR VEHICLE

(75) Inventors: Takumi Tsuyuzaki, Saitama (JP);
Manabu Ishizono, Saitama (JP);
Takashi Chirifu, Saitama (JP); Iwao Imaizumi, Saitama (JP); Yuji Kikuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/576,997

(22) PCT Filed: Nov. 16, 2010

(86) PCT No.: PCT/JP2010/070357
§ 371 (c)(1),
(2), (4) Date: Aug. 3, 2012

(87) PCT Pub. No.: WO2011/099206
PCT Pub. Date: Aug. 18, 2011

(65) Prior Publication Data
US 2012/0306221 A1 Dec. 6, 2012

(30) Foreign Application Priority Data
Feb. 12, 2010 (JP) .................................. 2010-029053

(51) Int. Cl.
*B60R 19/18* (2006.01)

(52) U.S. Cl.
USPC ............................ 293/102; 293/121; 293/133

(58) Field of Classification Search
USPC ................. 293/102, 109, 120–122, 132, 133, 293/155; 296/187.03, 187.04, 187.09, 187.11
See application file for complete search history.

(56) References Cited

U.S. PATENT DOCUMENTS

| 4,090,728 | A | | 5/1978 | Riedel | |
|---|---|---|---|---|---|
| 4,142,753 | A | | 3/1979 | Klie et al. | |
| 5,123,688 | A | * | 6/1992 | Takado et al. | 293/120 |
| 5,407,239 | A | * | 4/1995 | Arai et al. | 293/146 |
| 6,088,357 | A | * | 7/2000 | Anderson et al. | 370/392 |
| 6,814,380 | B2 | * | 11/2004 | Yoshida et al. | 293/120 |
| 7,144,055 | B2 | * | 12/2006 | Kimura et al. | 293/133 |
| 7,222,897 | B2 | * | 5/2007 | Evans et al. | 293/120 |
| 7,537,252 | B2 | * | 5/2009 | Nagai et al. | 293/102 |
| 7,637,545 | B2 | * | 12/2009 | Takahashi et al. | 293/132 |
| 7,641,245 | B2 | * | 1/2010 | Adachi et al. | 293/102 |

(Continued)

FOREIGN PATENT DOCUMENTS

| EP | 1 736 381 A1 | 12/2006 |
|---|---|---|
| JP | 2001-322517 A | 11/2001 |

(Continued)

*Primary Examiner* — Glenn Dayoan
*Assistant Examiner* — Gregory Blankenship
(74) *Attorney, Agent, or Firm* — Carrier Blackman & Associate, P.C.; Joseph P. Carrier; William D. Blackman

(57) ABSTRACT

Disclosed is a bumper structure equipped with an inner plate (42) in a hollow section (41) formed by a bumper beam (15) and a safety plate (16). The safety plate (16) comprises a top plate (35), a bottom plate (36), and a load input plate (37) connecting both. The inner plate (42) comprises a mounted section (46) that is mounted to the bumper beam (15), a leg section (48) that continues from the mounted section (46) and extends downward, a back support section (51) that continues from the leg section (48) and is approximately parallel to the top plate (35), and a load input flange (52) that continues from the back support section (51).

9 Claims, 6 Drawing Sheets

U.S. PATENT DOCUMENTS

| | | | |
|---|---|---|---|
| 7,686,358 B2 * | 3/2010 | Takahashi et al. | 293/102 |
| 7,699,367 B2 * | 4/2010 | Evans et al. | 293/120 |
| 8,368,523 B2 * | 2/2013 | Takahashi et al. | 340/436 |
| 2003/0227182 A1 * | 12/2003 | Yoshida et al. | 293/102 |
| 2005/0248164 A1 * | 11/2005 | Kimura et al. | 293/120 |
| 2006/0138790 A1 * | 6/2006 | Okabe et al. | 293/102 |
| 2007/0120383 A1 * | 5/2007 | Schmidt et al. | 293/102 |
| 2009/0015392 A1 * | 1/2009 | Takahashi et al. | 340/436 |
| 2012/0306221 A1 * | 12/2012 | Tsuyuzaki et al. | 293/102 |

FOREIGN PATENT DOCUMENTS

| | | |
|---|---|---|
| JP | 2007-001358 A | 1/2007 |
| JP | 2009-179136 A | 8/2009 |
| JP | 2009-248738 A | 10/2009 |
| JP | 4350584 B2 | 10/2009 |

* cited by examiner

BUMPER STRUCTURE FOR VEHICLE

TECHNICAL FIELD

The present invention relates to bumper structure for absorbing an impact at, for example, a head-on collision of a vehicle.

BACKGROUND ART

Bumper structures configured to absorb an impact via internal deformation of a bumper at a collision of a vehicle with an obstacle are known. The known bumper structures include a bumper face, a safety plate covered by the bumper face, and a bumper beam supporting the safety plate and extending in a vehicle width direction that are arranged in the named order as seen from the front of the vehicle. The safety plate has a generally U-shaped cross section and is mounted to the bumper beam while assuming a horizontal U-shaped position with its open end fitted with the bumper beam. The safety plate has a deformation guiding part provided at a lower part thereof attached to a bottom side of the bumper beam so that the safety plate is allowed to start deforming at the deformation guiding part and undergo complete collapsing to thereby absorb the impact (for example, see Patent Literature 1). Another known safety plate includes top and bottom walls having bent portions bent upward so that the safety plate is allowed to undergo deformation or collapsing at the bent portions as it absorbs an impact (for example, see Patent Literature 2).

The safety plates shown in Patent Literatures 1 and 2 require a long collapsing length for absorbing an impact. This means that a stroke length of the safety plates which corresponds to a distance between the safety plate and a front surface of the bumper beam is long and, hence, the entire length of the vehicle is extended correspondingly. Thus, a vehicle structure which is capable of reducing the stroke length while securing an impact absorbing capacity comparable to that of the conventional structures is desired.

PRIOR ART LITERATURE

Patent Literature

Patent Literature 1: Japanese Patent No. 4350584
Patent Literature 2: Japanese Patent Application Laid-open Publication No. 2009-179136.

SUMMARY OF INVENTION

Technical Problem

An object of the present invention is to provide a vehicle body front part structure which is capable of securing a sufficient impact-absorbing capacity and can reduce an impact-absorbing stroke length of a safety plate and a resulting impact-absorbing stroke length of a front bumper.

According to a first aspect of the present invention, there is provided a bumper structure for a vehicle, comprising: a bumper beam extending in a width direction of the vehicle; a bumper face covering the bumper beam; and a safety plate disposed behind the bumper face and supported by the bumper beam, wherein the safety plate has a substantially U-shaped cross section and is formed of a top plate, a bottom plate disposed below the top plate, and a load input plate connecting the top plate and the bottom plate, the safety plate being joined with the bumper beam at an open end opposite to the load input plate, wherein the bumper beam and the safety plate define therebetween a hollow section, and an inner plate is disposed in the hollow section, wherein the top plate is inclined obliquely downward from the bumper beam toward a forward direction of the vehicle, the load input plate is continuous with and extending substantially vertically downward from the top plate, and the bottom plate extends substantially horizontally from the load input plate to the bumper beam, and wherein the inner plate projects from the bumper beam in substantially parallel with the top plate.

Preferably, the inner plate is bent in a staircase shape as seen in side view of the vehicle and includes a mounted section mounted to a top wall of the bumper beam, a leg section continuing from the mounted section and extending downward along a front wall of the bumper beam, a back support section continuing from the leg section and being approximately parallel to the top plate, and a load input flange continuing from the back support section and extending along the load input plate.

Preferably, the bottom plate has a front portion inclined obliquely upward.

Preferably, the bottom plate has a front portion inclined obliquely upward at an angle of inclination smaller than an angle of inclination of the top plate.

Preferably, the load input flange is located on a horizontal line passing through a vertical central portion of the load input plate.

Preferably, the inner plate has a same length in a width direction of the vehicle as the safety plate.

Preferably, the leg section of the inner plate is separated from the front wall of the bumper beam.

Preferably, the safety plate and the inner plate are jointly fastened to the bumper beam.

Preferably, the inner plate has beads which are the same as beads formed on the safety plate.

The inner plate prevents continued deformation of the safety plate when the safety plate undergoes deformation due to an impact force acting on the safety plate.

Advantageous Effects of Invention

According to the invention, the safety plate has the top plate and the bottom plate connected by the load input plate and is joined with the bumper beam at its open end so that the bumper beam and the safety plate defines a hollow section in which the inner plate is disposed. The top plate is inclined obliquely downward from the bumper beam toward a forward direction of the vehicle, the load input plate continues from the top plate and extends downward in a substantially vertical direction, and the bottom plate extends substantially horizontally from the load input plate to the bumper beam. The inner plate projects from the bumper beam in substantially parallel with the top plate. With this arrangement, when the vehicle collides with an obstacle and an impact (load) is applied to the load input plate of the safety plate, the safety plate begins to absorb the impact. The safety plate undergoes deformation or collapsing and when the degree of collapsing reaches a half of the collapsing length or stroke length, the inner plate disposed in the hollow section starts to undergo compressive deformation (stroking) concurrently with continued compressive deformation (or stroking) of the safety plate, thereby absorbing the impact. As a result, the impact-absorbing stroke length of the safety plate can be reduced and eventually the impact-absorbing stroke length of the bumper beam can be reduced.

Furthermore, the inner plate includes the mounted section mounted to the top wall of the bumper beam, the leg section continuing from the mounted section and extending downward along the front wall of the bumper beam, the back support section continuing from the leg section and being approximately parallel to the top plate, and the load input flange continuing from the back support section and extending along the load input plate. With this arrangement, when the degree of deformation or collapsing of the safety plate reaches approximately a half of the full stroke length of the safety plate, the impact is transmitted from the load input plate of the safety plate to the load input flange of the inner plate. Upon application of the impact onto the load input flange, the back support section begins to deform together with the top and bottom plates of the safety plate, and the inner plate thus starts absorbing the impact.

During the course deformation or collapsing, the stroke length of the inner plate reaches about 30% of the full stroke length, whereupon as seen in side view of the vehicle, the back support section of the inner plate divides the hollow section into an upper hollow section and a lower hollow section in such a manner that an area of the upper hollow section is substantially equal to an area of the lower hollow section. Consequently, as a second half of the full stroke length is achieved, the impact can be absorbed in such a manner that the impact does not exceed a desired maximum value and varies substantially along the maximum value.

BRIEF DESCRIPTION OF DRAWINGS

FIG. 4 is an exploded perspective view of the bumper structure shown in

FIG. 1;

DESCRIPTION OF EMBODIMENT

A preferred embodiment of the present invention will be described below with reference to the accompanying sheets of drawings.

Embodiment

Figure 1:
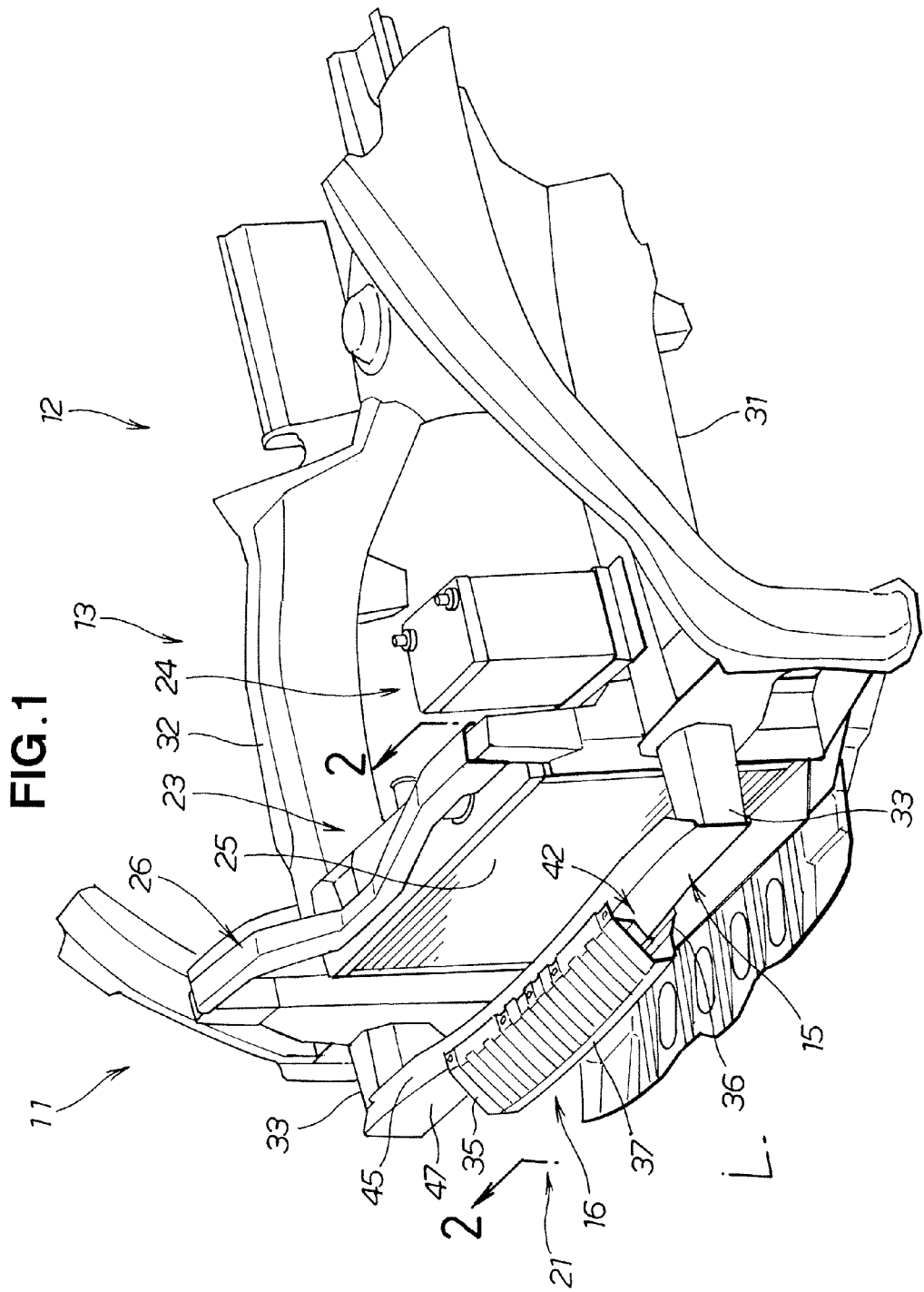
FIG. 1 is a perspective view of a vehicle body front part in which a bumper structure according to an embodiment of the present invention is employed.

A vehicle body front part structure (bumper structure) according to the embodiment is employed as an obstacle countermeasure in a front part (front body) 13 of a body 12 of a vehicle 11, as shown in FIG. 1.

In the illustrated embodiment, the bumper structure is a front bumper 21 for absorbing an impact produced when the vehicle 11 encounters a head-on collision.

Figure 2:
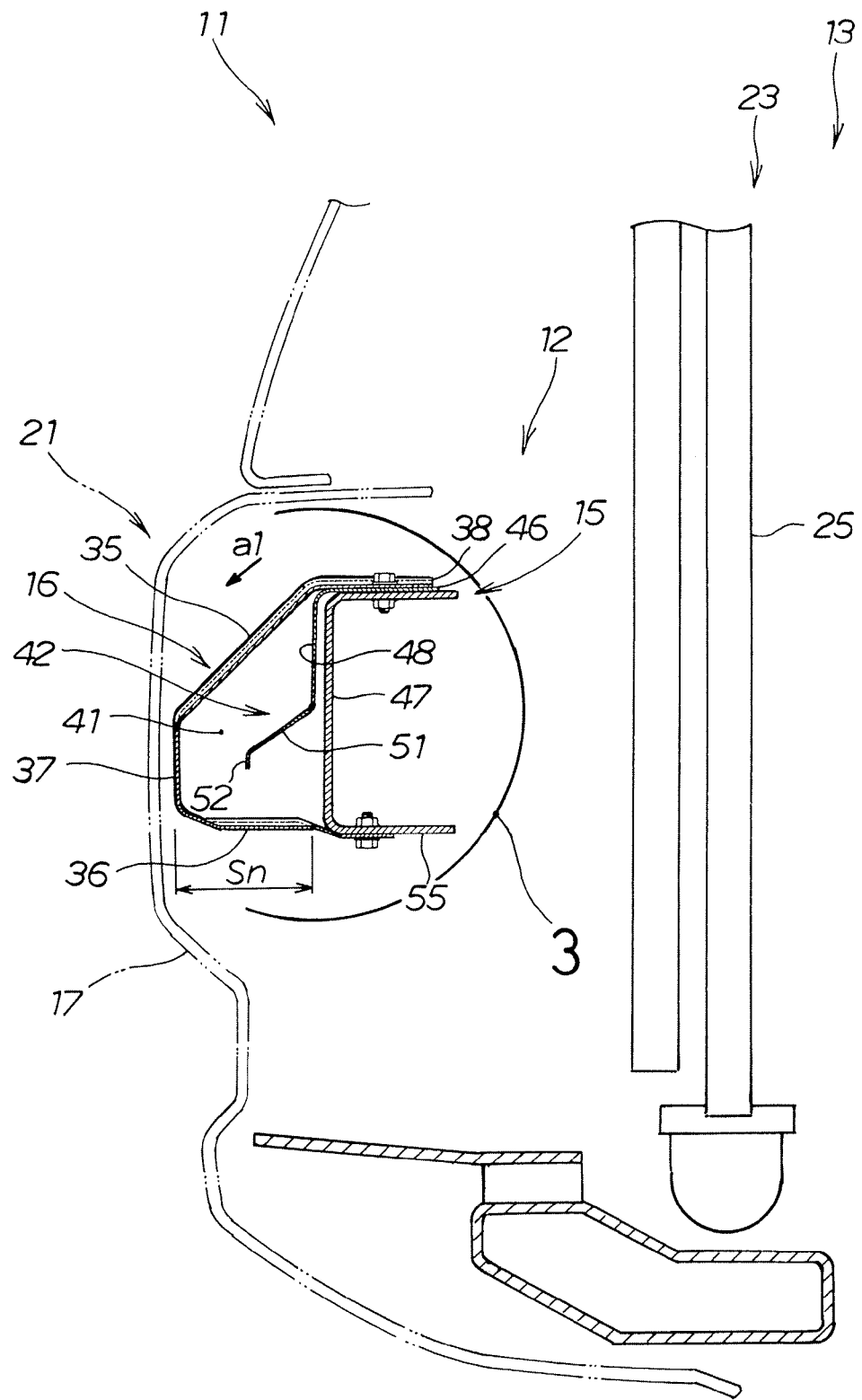
FIG. 2 is a cross-sectional view taken along the line 2-2 of FIG. 1.

As shown in FIGS. 1 and 2, the bumper structure includes a bumper beam (front bumper beam) 15 at a front side of the vehicle 11, an impact-absorbing safety plate 16 attached to the bumper beam 15, and a bumper face 17 covering the safety plate 16. The bumper face 17 forms a part of a front design of the vehicle 11.

The vehicle 11 is provided with the front bumper 21, a cooling device 23 for cooling an engine, and a battery 24. The cooling device 23 includes a heat exchanger 25 disposed behind the front bumper 21. The heat exchanger 25 is fixed to the front body 13 via a support frame 26.

The front body 13 includes a pair of side front side frames 31, 32 disposed on left and right sides of the vehicle body 12 and extending in a front-rear or longitudinal direction of the vehicle body 12, and the bumper beam (front bumper beam) 15 mounted to front ends 33, 34 of the front side frames 31, 32 and extending in a width direction of the vehicle. The bumper structure is supported by the bumper beam 15.

The bumper structure will be described in further details with reference to FIGS. 1 to 4.

The bumper structure generally comprises the bumper beam 15 extending in the vehicle width direction, the bumper face 17 covering the bumper beam 15, and the safety plate 16 disposed behind the bumper face 17 and supported by the bumper beam 15. The safety plate 16 absorbs impact energy as it undergoes deformation or yielding.

Figure 3:
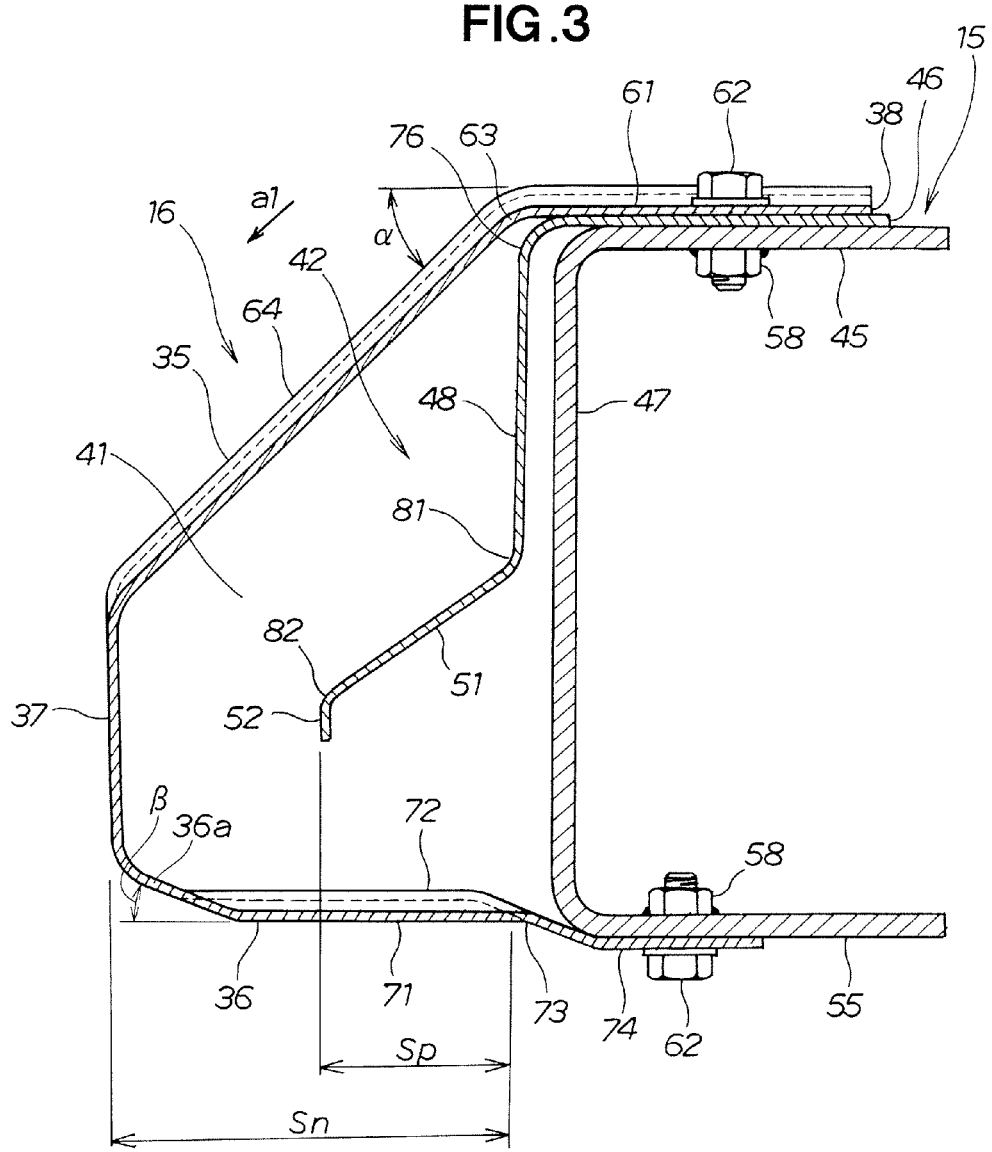
FIG. 3 is an enlarged view of a part surrounded by a circular arc 3 of FIG. 2.
Figure 4:
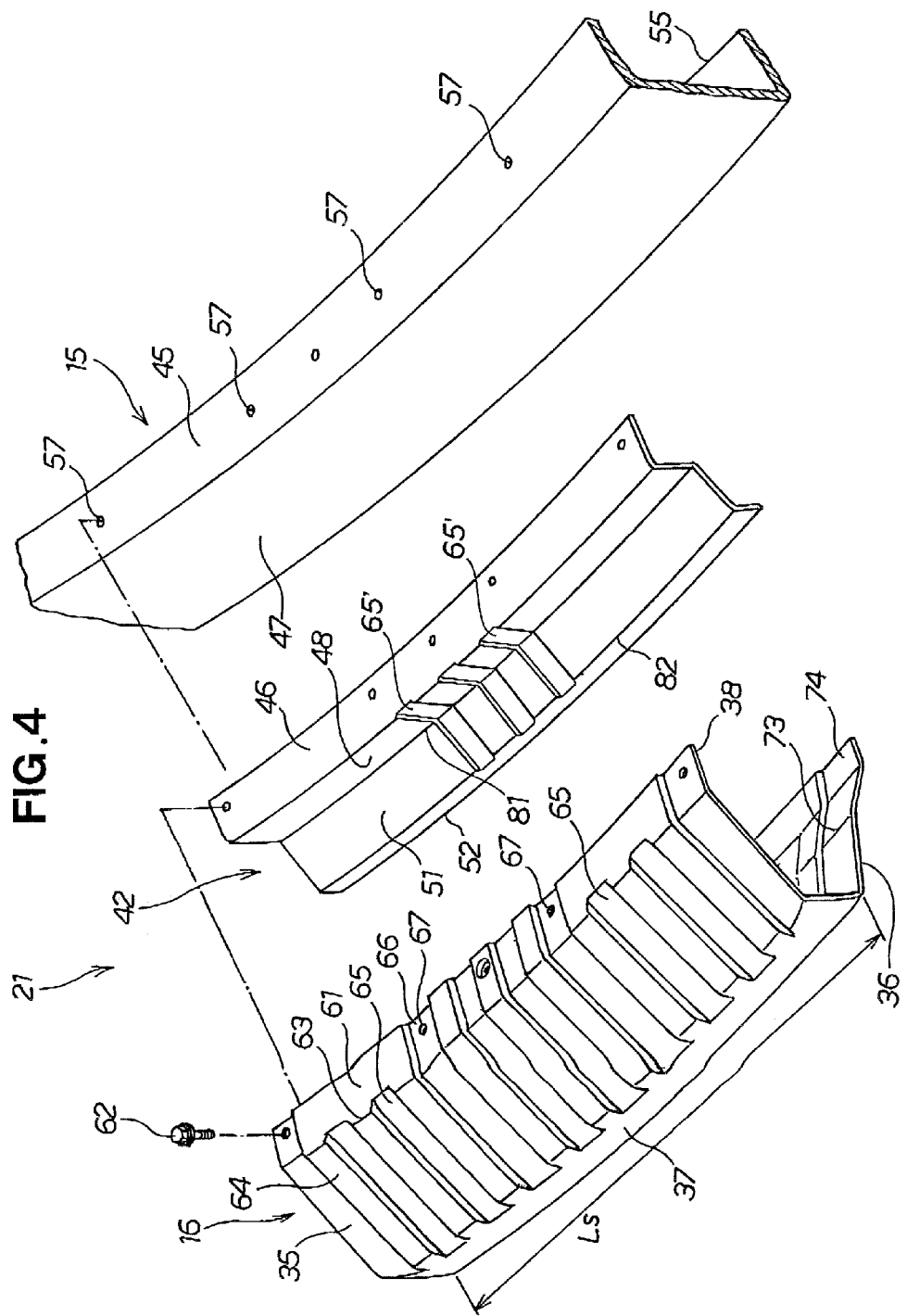

The safety plate 16 has a generally U-shaped cross section as seen in side view of the vehicle 11 (such as shown in FIG. 3) and includes a top plate 35 inclined obliquely downward toward a forward direction of the vehicle 11, a bottom plate 36 opposed to the top plate 35, and a load input plate 37 connecting the top plate 35 and the bottom plate 36. An open end 38 of the safety plate 16, which is opposite to the load input plate 37, is fitted with the bumper beam 15 so that a hollow section 41 is defined jointly between the bumper beam 15 and the top, bottom and load-input plates 35, 36, 37 of the safety plate 16. An inner plate (inner impact-absorbing plate) 42 is disposed in the hollow section 41.

The top plate 35 is inclined obliquely downward from the bumper beam 15 toward the forward direction of the vehicle 11 (in the direction of arrow a1). The load input plate 37 continues from the top plate 35 and extends downward in a substantially vertical direction. The bottom plate 36 is formed to extend substantially horizontally from the load input plate 37 to the bumper beam 15. The inner plate 42 projects from the bumper beam 15 in such a manner that the inner plate 42 is substantially parallel with the top plate 35 and spaced from the top plate 35 by a predetermined distance (FIG. 3).

The inner plate 42 is bent into a staircase shape as seen in side view of the vehicle 11 (such as shown in FIG. 3) and includes a mounted section (top fastened section) 46 mounted to a top wall 45 of the bumper beam 15, a leg section 48 continuing from the mounted section 46 and extending downward along a front wall 47 of the bumper beam 15, a back support section 51 continuing from the leg section 48, being approximately parallel to the top plate 35 and spaced from the top plate 35 by a predetermined distance, and a load input flange 52 continuing from the back support section 51 and extending along the load input plate 37.

The bumper beam 15 includes the top wall 45 disposed substantially horizontally, the front wall 47 extending downwardly from a front end of the top wall 45, and a bottom wall 55 continuous with a lower end of the front wall 47 and disposed opposite to and in parallel with the top wall 45.

The top wall 45 has a plurality of holes 57 (FIG. 4) formed to allow the safety plate 16 and the inner plate 42 to be fastened to the top wall 45, and a plurality of nuts 58 attached by welding to an inner surface of the top wall 45 in concentric relation to respective ones of the holes 57. The bottom wall 55 has a plurality of holes (not shown) formed to allow the safety plate 16 to be fastened to the bottom wall 55, and a plurality of nuts 58 attached by welding to an inner surface of the bottom wall 55 in concentric relation to respective ones of the holes.

Next, the safety plate 16 will be described in further details. The safety plate 16 has a maximum stroke length (or amount of deformation or yielding) Sn and hence can be deformed up to a maximum distance Sn according to the intensity of an impact force applied thereto. As the safety plate 16 undergoes deformation, the impact force applied to the safety plate 16 is reduced to a desired value (allowable maximum impact value Gm shown in FIG. 6(*c*)) mainly by the inclined top plate 35, bottom plate 36 and inner plate 42). The safety plate 16 has an overall length Ls and a midpoint of the overall length Ls is coincident with a widthwise center of the vehicle body.

The top plate 35 has a top mounted section 61 placed over the top wall 45 of the bumper beam 15 and fastened to the top wall 45 by a plurality of bolts 62. The mounted section 46 of the inner plate 42 is disposed between the top mounted section 61 of the top plate 35 and the top wall 45 of the bumper beam 15. A front end extremity (top bent portion) 63 of the top mounted section 61 projects from the bumper beam 15 in the forward direction of the vehicle 11.

The top mounted section 61 is substantially horizontal and the front end extremity (top bent portion) 63 of the top mounted section 61 is contiguous with a body 64 of the top plate 35. The top plate body 64 is bent at an acute angle (angle α) to the horizontal. The top plate body 64 has a plurality of beaded sections 65 formed to dent toward the hollow section 41 in a like manner as grooves. As seen in plan view of the vehicle 11, the beaded sections 65 extend parallel to an input direction of the impact or load (from the front to the rear of the vehicle) and they are spaced at a predetermined pitch in the vehicle width direction.

Some of the beaded sections 65 formed on the top plate body 64 are connected continuously with recessed portions 66 formed on the top mounted section 61, and fastening holes 67 are formed in bottom walls of some of the recessed portions 66. The fastening holes 67 are aligned with corresponding ones of the holes 57 formed in the top wall 45 of the bumper beam 15.

The load input plate 37 is spaced a desired distance Sn from the front wall 47 of the bumper beam 15 in the forward direction of the vehicle 11. The bottom plate 36 continues from a lower end of the load input plate 37.

The bottom plate 36 includes a bottom plate body 71 provided to lie in a plane above a bottom surface of the bottom wall 55 of the bumper beam 15. The bottom plate 36 has a front portion 36*a* inclined obliquely upward at an angle β relative to the horizontal. The inclination angle β of the front portion 36*a* of the bottom plate 36 is designed to be smaller than the inclination angle β of the top plate 35 of the safety plate 16. The bottom plate body 71 is provided with a plurality of beaded sections 72 formed substantially in the same manner as the beaded sections 65 formed on the top plate 35.

The bottom plate body 71 has a rear end extremity (bent portion) 73 bent downward so that a bottom mounted section 74 of the bottom plate 36 is lowered in position to a level of the bottom surface of the bottom wall 55 of the bumper beam 15. With the safety plate 16 thus arranged, the inner plate 42 is disposed centrally in the hollow section 41 defined partly by the safety plate 16.

Next, the inner plate 42 will be described in further details. The inner plate 42 has a length equal to the overall length (length in the vehicle width direction) Ls of the safety plate 16. The inner plate 42 has a maximum stroke (or amount of deformation) Sp and can be deformed up to a maximum distance SP according to the intensity of an impact force applied thereto.

The inner plate 42 is fixed to the top wall 45 of the bumper beam 15 with its mounted section (top fastened section) 46 being forced against the top wall 45 by the top mounted section 61 of the safety plate 16. Thus, the inner plate 42 is fastened together with the safety plate 16 to the bumper beam 15.

The mounted section 46 has a front end extremity (top bent portion) 76 bent downward and projecting in the forward direction of the vehicle 11 from the bumper beam 15. The leg section 48 is continuous with the top bent portion 76, extends perpendicularly to the mounted section 46, and is spaced from the bumper beam 15. Thus, the leg section 48 of the inner plate 42 is separated forwardly from the front wall 47 of the bumper beam 15. However, the leg section 48 may alternatively be in contact with the front wall 47 of the bumper beam 15.

The leg section 48 extends downwardly and terminates at a lower end extremity (central bent portion) 81 which is located at a vertical central portion of the front wall 47 of the bumper beam 15. In other words, the leg section 48 is approximately half the height of a height of the front wall 47 of the bumper beam 15. The lower end extremity (central bent portion) 81 is continuous with the back support section 51.

The back support section 51 is inclined obliquely downward toward the forward direction of the vehicle so that it can produce a downward depressing component force when subjected to a head-on collision. The back support section 51 has a front end 82 contiguous with the load input flange 52. The load input flange 52 is disposed at a central portion of the hollow section 41 of the safety plate 16. In other words, the load input flange 52 is located on a horizontal line extending through a vertical central portion of the load input plate 37 of the safety plate 16.

Figure 5:
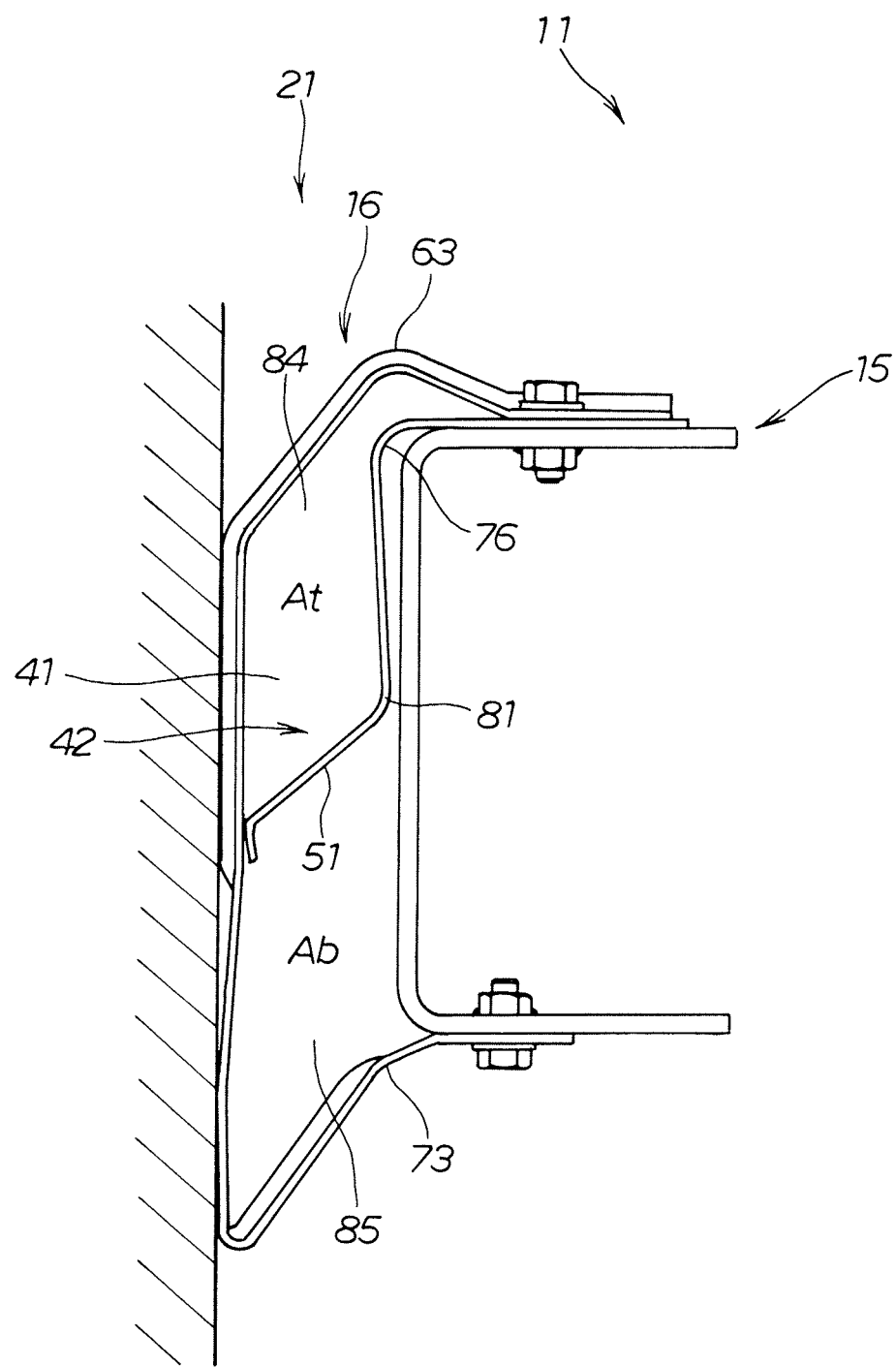
FIG. 5 is a view illustrative of the manner in which the bumper structure absorbs an impact.

Preferably, as shown in FIG. 5, when the back support section 51 begins to deform in a downward direction (or when the safety plate 16 has achieved its deformation stroke up to about 60%) under the effect of an impact acting on the front of the vehicle 11, the back support section 51, as seen in side view of the vehicle 11, divides the hollow section 85 into an upper hollow section 84 and a lower hollow section 85 in such a manner that an area At of the upper hollow section 84 is equal to an area of the lower hollow section 85.

The back support section 51 and the leg section 48 may be provided with beaded sections 65' (FIG. 4) at their central portions thereof in the same manner as the beaded sections 65 that are provided on the top plate 35 of the safety plate 16.

The load input flange 52 is bent in a vertical downward direction from the front end 82 of the back support section 51 and has a desired height.

Figure 6:
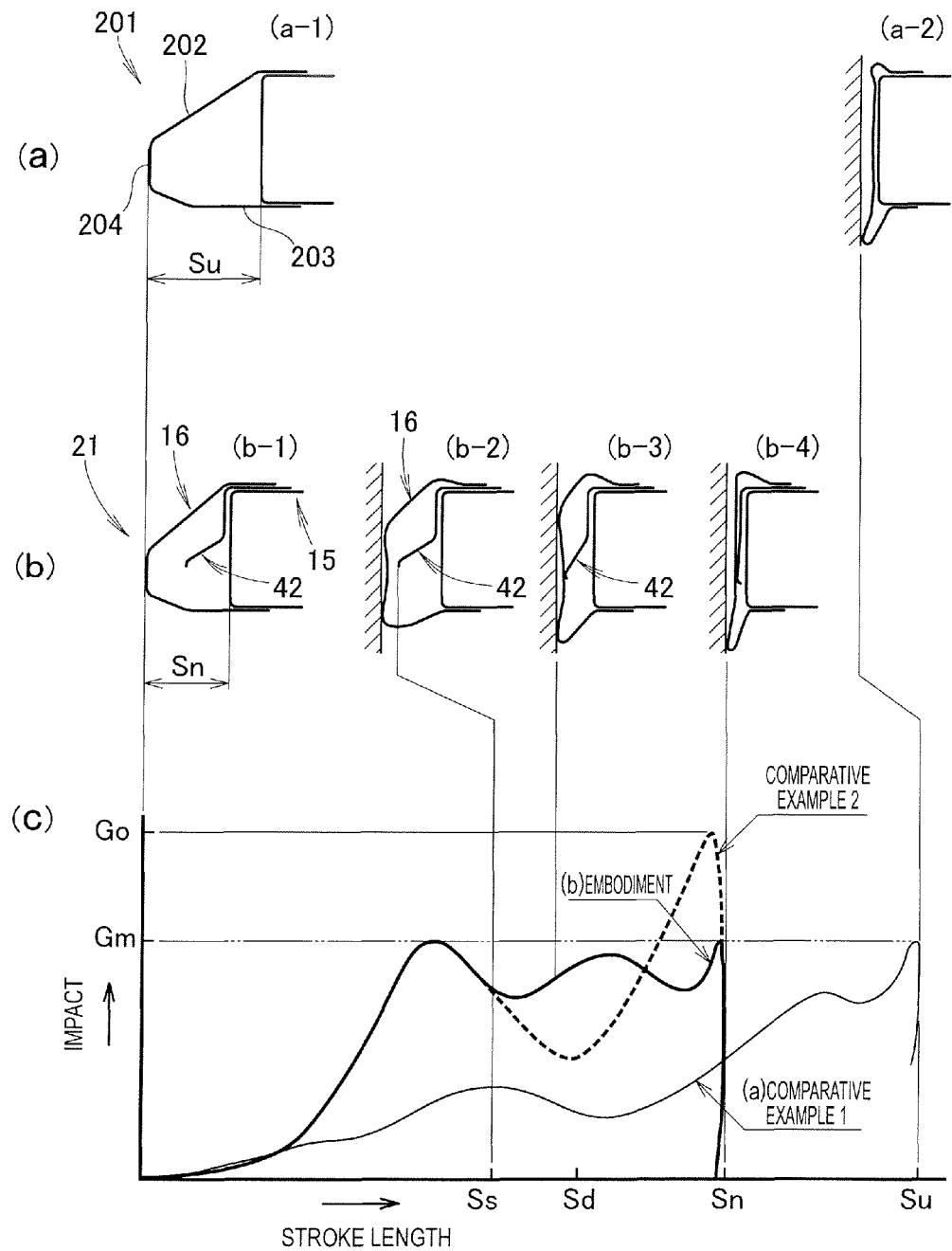
FIG. 6 is a diagrammatical view illustrative of the manner in which a safety plate undergoes deformation when the bumper structure absorbs the impact.

Next, operation of the bumper structure will be described below with reference to FIGS. 5 and (b) of FIG. 6. Description is first given to an operation as to how the amount of deformation or stroke length of the bumper structure can be reduced. In FIGS. 5 and 6, the bumper face 17 (FIG. 2) is omitted.

In the bumper structure, when an impact is applied to the front bumper at the front of the vehicle 11, the safety plate 16 and the inner plate 42 undergo deformation (or stroking) in the rearward direction of the vehicle to thereby absorb the impact (see FIG. 6(*b*)).

The bumper structure requires a stroke length Sn for absorbing the impact and can provide a noticeable reduction in the stroke length.

When subjected to an impact, the bumper face 17 and the safety plate 16 begin to deform (FIG. 6(*b*-2). When the safety plate 16 has achieved a desired amount of deformation (stroke length Ss), it begins to transfer the impact to the inner plate 42. Thus, when the safety plate 16 has undergone deformation up to the stroke length Ss, the inner plate 42 comes into contact with the safety plate 16 and temporarily blocks continued deformation of the safety plate 16.

Subsequently, the inner plate 42 continues to undergo deformation (until the stroke length Sn is achieved) to thereby continuously absorb the impact. After the stroke length exceeds the value Ss, the inner plate 42 acts to resist the impact in cooperation with a reaction force of the safety plate 16 and reduces the impact in such a manner that the impact does not exceed a maximum allowable value Gm and varies along the maximum allowable value Gm.

In a bumper structure according to Comparative Example 2, an inner plate corresponding to the inner plate 42 is not provided and, hence, the impact cannot be absorbed until when a stroke length Sn is achieved. In the case where the bumper beam 15 has a sufficient strength and rigidity, a very high impact value Go can be observed when the impact acts on the rigid bumper beam 15. The impact value Go is greatly larger than the maximum allowable value Gm. In order to absorb the impact energy while keeping an impact value below the allowable maximum value Gm, it is necessary to increase the stroke length up to a value Su, which is considerably larger than the stroke length Sn of the bumper structure of the invention.

Thus, by virtue of the safety plate 16 and the inner plate 42, the bumper structure of the present invention is able to reduce the impact-absorbing stroke length.

Next, a vehicle body front part structure according to the embodiment of the present invention and those of Comparative Examples 1 and 2 will be described below with reference to FIG. 6.

(a) of FIG. 6 illustrates in diagrammatically cross section the vehicle body front part structure of Comparative Example 1, wherein (a-1) of FIG. 6 shows the vehicle body front part structure as it is in a pre-deformation state, and (a-2) of FIG. 6 shows the vehicle body front part structure as it is in a post-deformation state. An impact absorbing member 201 of Comparative Example 1 includes a top wall 202, a bottom wall 203 and a front wall 204 and has a stroke length Su which is longer than the stroke length Sn of the vehicle body front part structure embodying the invention. The vehicle body front part structure of Comparative Example 2 is not shown in FIG. 6 but is structurally the same as the vehicle body front part structure of the invention with the exception that the inner plate 42 is removed.

(b) of FIG. 6 illustrates in diagrammatically cross section the vehicle body front part structure according to the embodiment of the present invention, wherein (b-1) of FIG. 6 shows the vehicle body front part structure as it is in a pre-deformation state, (b-2) and (b3) of FIG. 6 show the vehicle body front part structure as it is in the course of deformation, and (b4) of FIG. 6 shows the vehicle body front part structure as it is in a post-deformation state. For purposes of illustration, the stroke lengths Su and Sn shown in FIGS. 6(a) and 6(b) are shown on reduced scale as compared to the stroke length Su and Sn shown in FIG. 6(c).

(c) of FIG. 6 is a graph showing the relationship between the impact (load) and the stroke length, wherein a vertical axis represents the impact (load) and the horizontal axis represents the stroke length. In FIG. 6(c), a thin solid line represents the Comparative Example 1, a broken line represents the Comparative Example 2, and a thick solid line represents the embodiment of the present invention.

The vehicle body front part structure according to Comparative Example 1 needs to have a stroke length Su in order to reduce the applied impact to the maximum allowable impact value Gm. The stroke length Su is relatively long.

The vehicle body front part structure according to Comparative Example 2 has a stroke length Sn which is shorter than the stroke length Su of Comparative Example 1, however, it involves generation of a large impact value Go which is greater than the allowable maximum impact value Gm. Due to a sudden drop in the impact absorbing capacity occurring when the stroke length reaches a value Sd, the relatively short stroke length Sn is not sufficiently long enough to reduce the impact to the allowable maximum impact value Gm.

The vehicle body front part structure according to the embodiment of the present invention can lower the impact to a level below the allowable maximum impact value Gm even though the stroke length Sn is smaller than the stroke length Su. This is because when the stroke length reaches around a value Sd, the area At of the upper hollow section 84 and the area Ab of the lower hollow section 85 become almost equal to each other, and this is particularly effective to stabilize a form of deformation. Furthermore, by virtue of the inner plate 42, it is possible to prevent a sudden drop in the impact absorbing capacity which would otherwise occur at around the stroke length value Sd and also to shorten the stroke length.

Thus, the bumper structure according to the embodiment of the invention is able to improve impact absorbing performance of the safety plate 16 and also to shorten the impact absorbing stroke length of the safety plate 16.

As a result, the front bumper 21 can possess improved impact absorbing capability and reduced impact absorbing stroke length.

The inner plate 42 may be provided on its back support section 51 and leg section 48 with beaded sections similar to the beaded sections 65, in order to produce an enhanced reaction force and shorten the stroke length.

The load input flange 52, which is bent to extend in a vertical downward direction from the front end 82 of the back support section 51, has a predetermined height and, hence, the load input flange 52 is able to make a face-to-face contact with the load input plate 37 of the safety plate 16 and thus minimize variation in input load. The load input flange 52 also serves to prevent the inclined back up section 51 of the inner plate 42 from deflecting in a longitudinal direction (vehicle width direction) of the inner plate 42.

The inner plate 42 is fixed in position in such a way that the mounted section (top fastened section) 46 is being forced against the top wall 45 of the bumper beam 15 by the top mounted section 61 of the safety plate 16. As a result, merely by securing the safety plate 16 to the top wall 45 by using the bolt 62, mounting of the inner plate 42 is automatically completed. This arrangement is able to reduce the number of parts used and simplify a mounting structure of the inner plate 42.

In the illustrated embodiment, the bumper structure of the present invention is used in a front body. However, the bumper structure can also be employed in a rear body. Furthermore, the bumper structure is used in a vehicle, however, it can be used in an equipment other than vehicle.

INDUSTRIAL APPLICABILITY

The vehicle body front part structure according to the present invention can be suitably used in a vehicle.

LIST OF REFERENCE NUMERALS

11 . . . vehicle
13 . . . front part of vehicle (front body)
15 . . . bumper beam
16 . . . safety plate 17 ... bumper face
35 ... top plate of safety plate
36 ... bottom plate of safety plate
37 ... load input plate of safety plate
38 ... open end of safety plate
41 ... hollow section
42 ... inner plate
45 ... top wall of bumper beam
46 ... mounted section of inner plate
48 ... leg section of inner plate
51 ... buck support section of inner plate
52 ... load input flange of inner plate

The invention claimed is:

1. A bumper structure for a vehicle, comprising:
a bumper beam extending in a width direction of the vehicle;
a bumper face covering the bumper beam; and
a safety plate disposed behind the bumper face and supported by the bumper beam,
wherein the safety plate has a substantially U-shaped cross section and is formed of a top plate, a bottom plate disposed below the top plate, and a load input plate connecting the top plate and the bottom plate, the safety plate being joined with the bumper beam at an open end opposite to the load input plate,
wherein the bumper beam and the safety plate define therebetween a hollow section, and an inner plate is disposed in the hollow section,
wherein the top plate is inclined obliquely downward from the bumper beam toward a forward direction of the vehicle, the load input plate is continuous with and extending substantially vertically downward from the top plate, and the bottom plate extends substantially horizontally from the load input plate to the bumper beam,
wherein the inner plate projects from the bumper beam in substantially parallel with the top plate, and
wherein the inner plate is bent in a staircase shape as seen in side view of the vehicle and includes a mounted section mounted to a top wall of the bumper beam, a leg section continuing from the mounted section and extending downward along a front wall of the bumper beam, a back support section continuing from the leg section and being approximately parallel to the top plate, and a load input flange continuing from the back support section and extending along the load input plate.

2. The bumper structure of claim 1, wherein the bottom plate has a front portion inclined obliquely upward.

3. The bumper structure of claim 1, wherein the bottom plate has a front portion inclined obliquely upward at an angle of inclination smaller than an angle of inclination of the top plate.

4. The bumper structure of claim 1, wherein the load input flange is located on a horizontal line passing through a vertical central portion of the load input plate.

5. The bumper structure of claim 1, wherein the inner plate has a same length in a width direction of the vehicle as the safety plate.

6. The bumper structure of claim 1, wherein the leg section of the inner plate is separated from the front wall of the bumper beam.

7. The bumper structure of claim 1, wherein the safety plate and the inner plate are jointly fastened to the bumper beam.

8. A bumper structure for a vehicle, comprising:
a bumper beam extending in a width direction of the vehicle;
a bumper face covering the bumper beam; and
a safety plate disposed behind the bumper face and supported by the bumper beam,
wherein the safety plate has a substantially U-shaped cross section and is formed of a top plate, a bottom plate disposed below the top plate, and a load input plate connecting the top plate and the bottom plate, the safety plate being joined with the bumper beam at an open end opposite to the load input plate,
wherein the bumper beam and the safety plate define therebetween a hollow section, and an inner plate is disposed in the hollow section,
wherein the top plate is inclined obliquely downward from the bumper beam toward a forward direction of the vehicle, the load input plate is continuous with and extending substantially vertically downward from the top plate, and the bottom plate extends substantially horizontally from the load input plate to the bumper beam,
wherein the inner plate projects from the bumper beam in substantially parallel with the top plate, and,
wherein the inner plate has beaded sections which are the same as beaded sections formed on the safety plate.

9. The bumper structure of claim 1, wherein the inner plate prevents continued deformation of the safety plate when the safety plate undergoes deformation due to an impact force acting on the safety plate.

* * * * *